United States Patent
Minami et al.

(10) Patent No.: US 6,800,021 B2
(45) Date of Patent: Oct. 5, 2004

(54) END FACE POLISHING APPARATUS

(75) Inventors: Koji Minami, Chiba (JP); Junji Taira, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/783,878

(22) Filed: Feb. 15, 2001

(65) Prior Publication Data

US 2001/0021631 A1 Sep. 13, 2001

(30) Foreign Application Priority Data

Mar. 13, 2000 (JP) ......................................... 2000-069277

(51) Int. Cl.[7] ................................................. B24B 7/00
(52) U.S. Cl. ....................................... 451/278; 451/384
(58) Field of Search ........................... 451/41, 42, 270, 451/278, 279, 390, 240, 255, 256, 277, 323, 384, 389, 398

(56) References Cited

U.S. PATENT DOCUMENTS

| 4,831,784 A | * | 5/1989 | Takahashi | 451/288 |
| 4,979,334 A | * | 12/1990 | Takahashi | 451/271 |
| 5,184,433 A | * | 2/1993 | Maack | 451/41 |
| 5,458,531 A | * | 10/1995 | Matsuoka et al. | 451/259 |
| 6,110,013 A | * | 8/2000 | Minami et al. | 451/278 |
| 6,280,293 B1 | * | 8/2001 | Minami et al. | 451/10 |
| 6,592,433 B2 | * | 7/2003 | Buehler | 451/36 |

FOREIGN PATENT DOCUMENTS

| JP | 05019140 | 1/1993 |
| JP | 7112356 | 5/1995 |
| JP | 9155711 | 6/1997 |
| JP | 10249696 | 9/1998 |

* cited by examiner

Primary Examiner—Timothy V. Eley
(74) Attorney, Agent, or Firm—Adams & Wilks

(57) ABSTRACT

An end face polishing apparatus has a jig plate for supporting at least one workpiece having an end face, a polishing plate mounted for undergoing movement, and a polishing member mounted on the polishing plate for undergoing movement therewith to polish the end face of the workpiece. A slidable contact member is disposed on one of the jig plate and the polishing plate for contacting the other of the jig plate and the polishing plate to thereby regulate a polishing amount of the end face of the workpiece.

25 Claims, 5 Drawing Sheets

END FACE POLISHING APPARATUS

BACKGROUND OF THE INVENTION

1. Field of the Invention

The present invention relates to an end face polishing apparatus for polishing end faces of rod-shaped members of optical communication fibers and the like.

2. Description of the Related Art

An optical communication fiber is used after it has been adhered and fixed to a center hole of a ferrule which is a main member of a connector, and then an end surface of the ferrule and an end surface of the fiber are simultaneously polished to provide a smooth mirror surface. If the polished surfaces of the ferrule and the fiber thus polished are not vertical to a center axis of the ferrule, or the polished surfaces are damaged, the accuracy of an optical connector having such ferrules connected with each other is deteriorated, thereby resulting in an increase in signal loss. Therefore, the polished surface of a ferrule including an optical fiber requires finishing of the polished surface with high accuracy.

Japanese Patent Application Laid-open No. 3-26456 discloses a conventional optical fiber end face polishing apparatus. The optical fiber end face polishing apparatus disclosed in this publication has an eccentric plate which rotates on a concentric circle of a self-rotation disc, and has a planetary gear which transmits rotation of a motor for revolution to this eccentric plate, and these are combined with a polishing plate to cause the polishing plate to self-rotate and revolve. The end-faces of the ferrules supported by a jig plate are pressed against the polishing member fixed to the polishing plate and polished.

As described above, the conventional optical fiber end-face polishing apparatus conducts a polishing operation by pressing with a spring the end faces of a plurality of ferrules, such as rod-shaped members, supported by the jig plate against the polishing member fixed to the rotating and revolving polishing plate. However, polishing of the rod-shaped members is adjusted by time, so that the polishing length of the rod-shaped members cannot be adjusted. Further, there is no problem if the lengths of the ferrules mounted on the jig plate are all the same, however, since adhesives for fixing the ferrule and the optical fiber together flow out from the tip end of the ferrule and harden, the lengths of the respective ferrules differ. Therefore, if the ferrules differing in lengths are made to slidable contact the polishing plate, the jig plate tilts relative to the polishing plate, thereby causing variations in the polishing angle, radius of curvature and eccentricity. Further variations in ferrule lengths also occur after polishing.

SUMMARY OF THE INVENTION

It is an object of the present invention to provide an end face polishing apparatus with improved polishing accuracy regardless of the length of the ferrule when polishing the end faces of the ferrule.

According to a first aspect of the present invention, an end face polishing apparatus has a jig plate for supporting a rod-shaped member, a polishing member, a polishing member mounted on a polishing plate for polishing an end face of the rod-shaped member, and an apparatus body for rotationally and pivotally supporting the polishing plate. A slidable contact member is provided on one of the jig plate and the polishing plate for contacting the other of the jig plate and the polishing plate with low friction.

According to a second aspect of the present invention, the length in the axial direction of the rod-shaped member protruding form the lower end face of the jig plate is longer than the height of the slidable contact member.

According to a third aspect of the present invention, the jig plate is biased against the polishing plate by an apparatus body of a support mechanism.

According to a fourth aspect of the present invention, the jig plate comprises an adjusting mechanism for adjusting the height of the polishing member.

According to the end face polishing apparatus of the present invention, by providing a slidable contact portion on either the jig plate or the polishing plate to slidably contact the other with low friction, the jig plate can be maintained horizontal to the polishing plate, thereby improving the polishing accuracy of the rod-shaped member. Further, the length of the rod-shaped members may be made uniform.

DETAILED DESCRIPTION OF THE PREFERRED EMBODIMENTS

The embodiments of the present invention are explained below referring to the figures.

Embodiment 1

Figure 1A:
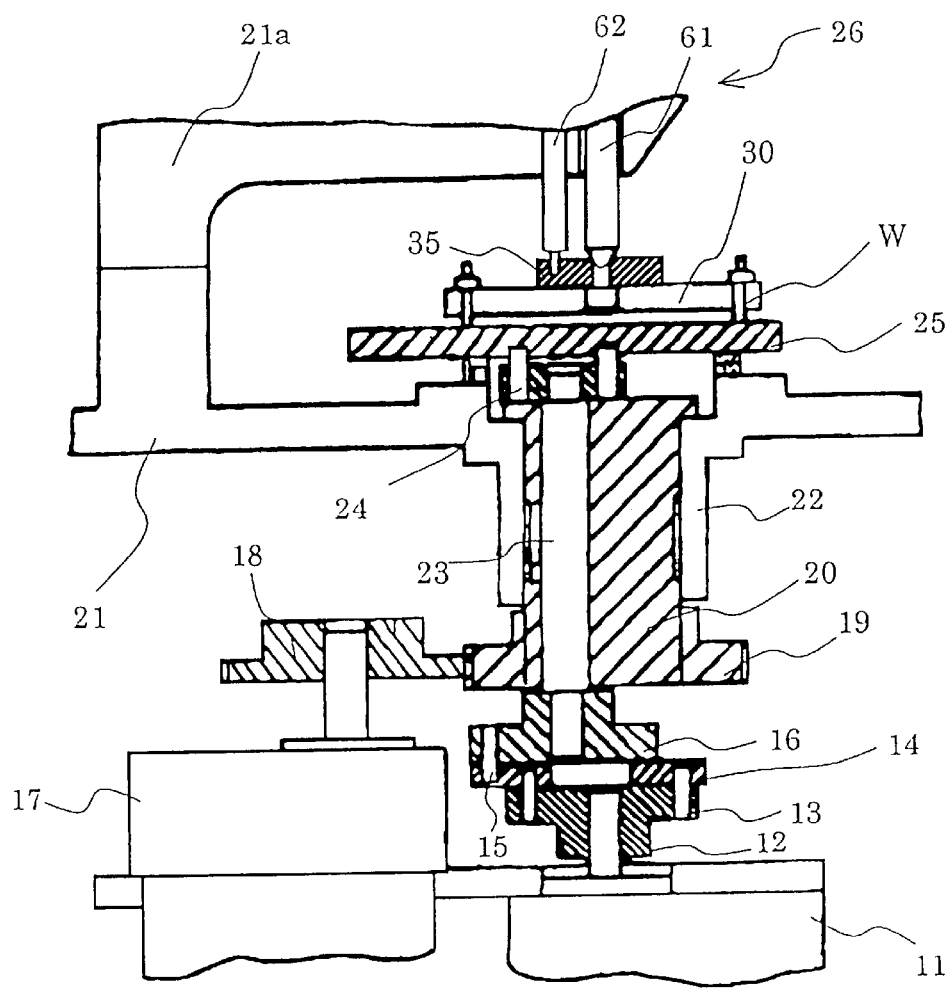
FIGS. 1A and 1B are, respectively, a part of a cross section view and an enlarged view of an end face polishing apparatus according to Embodiment 1 of this invention.
Figure 1B:
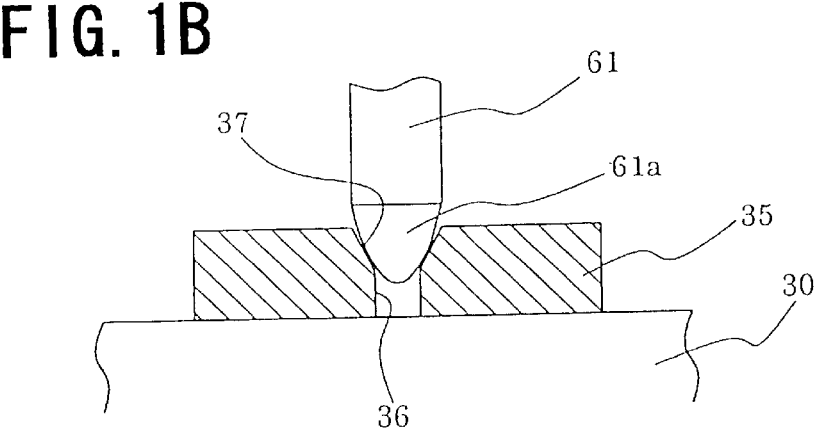

FIGS. 1A and 1B, respectively, are a part of a perspective view and an enlarged view of an end face polishing apparatus of an embodiment of this invention.

Figure 2A:
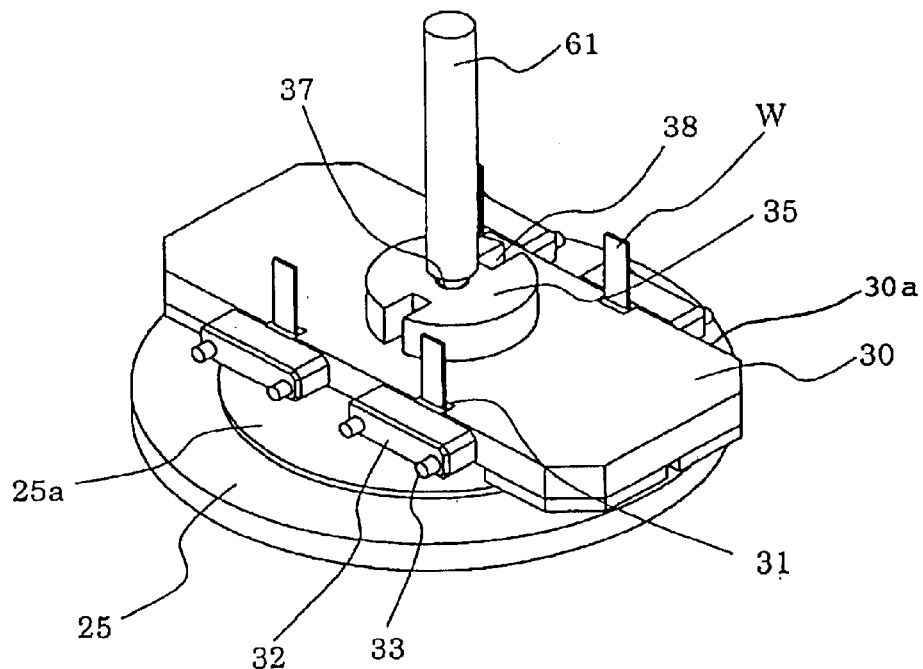
FIGS. 2A and 2B are, respectively, a perspective view and a top view of a jig plate according to Embodiment 1 of this invention.
Figure 2B:
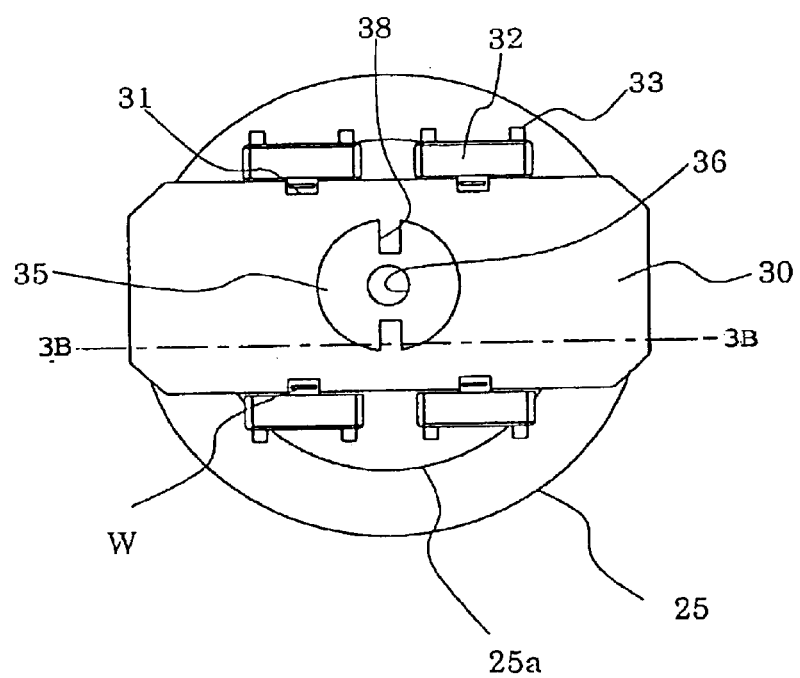
Figure 3A:
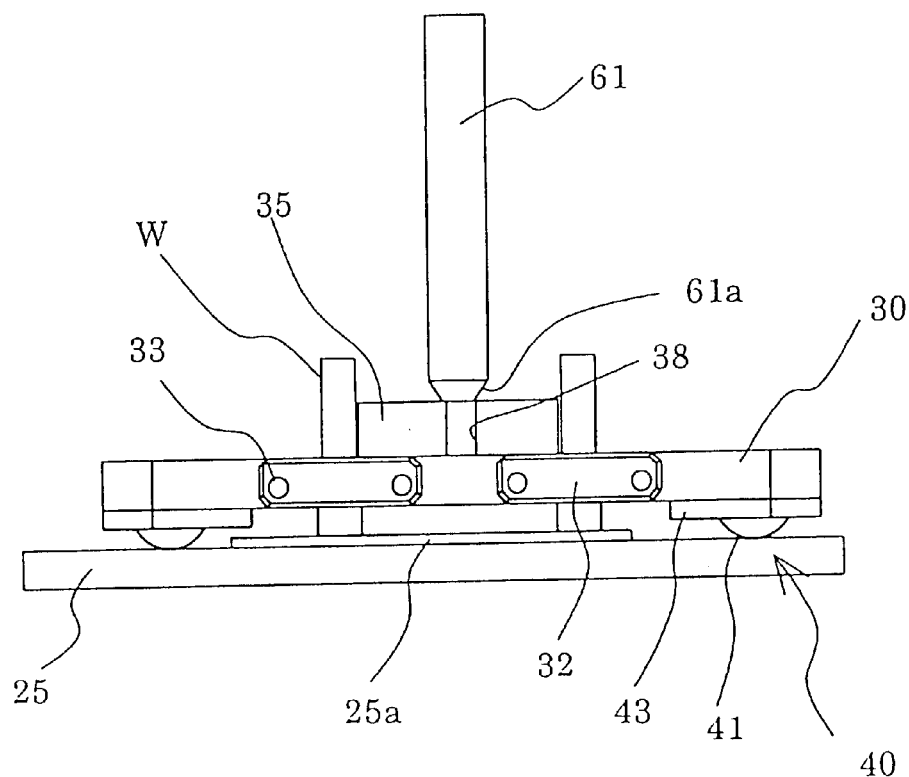
FIG. 3A is a plan view and FIG. 3B is a cross section view taken along line 3B—3B of FIG. 2B of a jig plate according to Embodiment 1 of this invention.
Figure 3B:
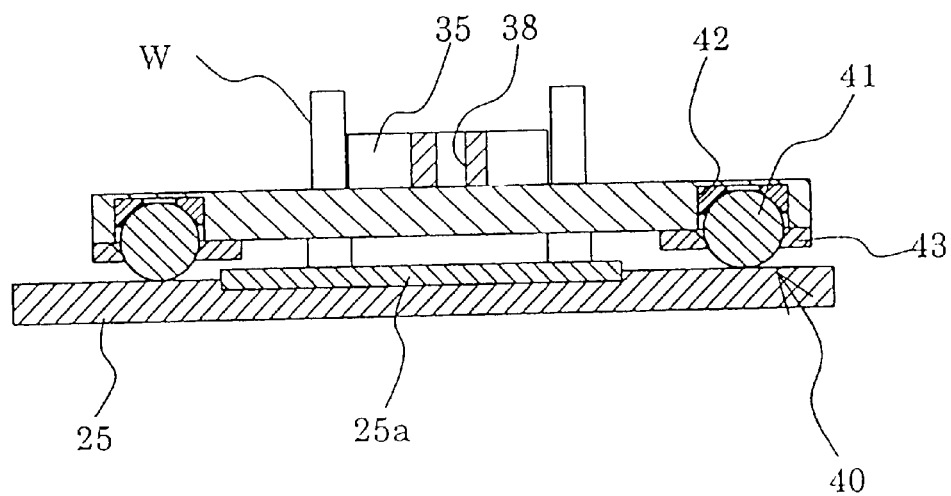

FIGS. 2A and 2B, respectively, are a perspective view and a top view of a jig plate, and FIGS. 3A and 3B, respectively, are a front view and a cross section view of a jig plate.

As shown in FIG. 1, the rotating shaft of the motor 11 for self-rotation is firmly fixed to the center portion of the first rotation transmitting shaft 12, and on the first rotation transmitting shaft 12 a plurality of first coupling pins 13 are fixed on the concentric circle with the rotation center as the fulcrum. Then the respective first coupling pins 13 are coupled rotatably to the eccentric portion of the corresponding respective rotation transmitting plates 14. The eccentric portion of the respective rotation transmitting plates 14 are fixed with second coupling pins 15. The respective second coupling pins 15 are coupled to a second rotation transmitting plate 16.

On the other hand, the rotating shaft of the motor 17 for revolution is firmly fixed with a center portion of the driving gear 18, and this driving gear 18 engages with a following gear 19. This following gear 19 is firmly fixed to a periphery of the lower portion of the revolution transmitting shaft 20, and around the periphery of the upper portion of this revolution transmitting shaft 20, a bearing cylinder portion 22 of the apparatus body 21 is coupled. Then, this revolution transmitting shaft 20 is inserted with a rotating shaft 23 for self-rotation in a position that is eccentric by a predetermined amount from the rotation center, and the lower end portion of the rotating shaft 23 for self-rotation is fixed to the center portion of the second rotation transmitting plate 16.

Further, the upper end portion of the rotating shaft 23 for self-rotating is connected to the polishing plate 25 by a coupling member 24, and a polishing member 25a is provided on the upper surface portion of the polishing plate 25.

On the other hand, in an apparatus body 21, a jig plate 30 supporting a plurality of rod-shaped members W, such as ferrules, are supported by a support mechanism 26.

Next, the support mechanism 26 and the jig plate 30 will be explained in detail.

As shown in FIGS. 2A, 2B and FIGS. 3A, 3B, the jig plate 30 has a generally rectangular-shaped body 30a and mounting pieces 32, each disposed opposite to a respective one of recess portions 31 are formed on opposite side surfaces of the body 30a. Rod-shaped members W are disposed between the mounting pieces 32 and the recess portions 31, and the mounting pieces are connected to the body 30a with fixing screws 33, thereby detachably mounting the rod-shaped members W to the body 30a of the jig plate 30.

Further, in the upper face center portion of the jig plate 30 is provided a boss portion 35, at the center of which a through hole 36 is provided in the direction of the thickness of the boss portion 35. The upper portion side of this through hole 36 is a taper portion 37 which increases toward the opening.

Further, the region opposite the polishing plate 25 at the lower-surface of the jig plate 30 is provided with a slidable contact member 40 slidably contacting the polishing plate 25 with low friction. In this embodiment, the slidable contact member 40 comprises four ball members 41 mounted on the lower surface of the jig plate 30 for rotation relative to the jig plate 30. Specifically, holding holes or pockets 42 are formed on the lower surface of the jig plate 30, and each of the ball members 41 which is spherical is inserted in a respective one of the holding holes 42. Each of the holding holes 42 is covered with a plate member 43 having an opening of a diameter slightly smaller than a diameter of the ball members 41, so that the ball members 41 are rotatably supported on the lower surface of the jig plate 30. Since the ball members 41 relative to the jig plate 30 the polishing plate 25, there is low friction between the jig plate and the polishing plate so that the jig and the polishing plate can be maintained in a horizontal state. Further, the jig plate 30 is mounted with rod-shaped members W which protrude from the slidable contact member 40.

The support mechanism 26 has a pressing shaft 61 for pressing the boss portion 35 downwards with a predetermined pressure force, and a rotation stopping pin 62 disposed in parallel relation to the pressing shaft 61. The tip end of the pressing shaft 61 is a conical portion 61a, which is inserted in the taper portion 37 provided in the boss portion 35 of the jig plate 30 to thereby the jig plate 30 downwards. Further, the rotation stopping pin 62 is engaged with the notch portion 38 formed in the boss portion 35 to regulate the direction of rotation of the jig plate 30.

Namely, the jig plate 30 is pressed in the direction of the polishing plate 25 by the pressing shaft 61 in a state where the rotation direction of the jig plate is regulated by the rotation stopping pin 62, and is supported on the polishing plate 25 by a tip end portion or end face of each of the rod-shaped members W connected to the jig plate 30 by a respective mounting piece 32. After the rod-shaped members W are polished a predetermined amount, the slidable contact member 40 slidably contacts the polishing plate 25 and the jig plate 30 is supported in parallel relation to the polishing plate 25, thereby regulating the polishing amount of the end faces of the rod-shaped members W.

By providing a slidable contact member 40 slidably contacting the polishing plate 25 with low friction in the lower surface of the jig plate 30, the rod-shaped members W can be polished with the position of the polishing plate 25 slidably contacting the jig plate 30 as a standard for polishing. Therefore, a polishing amount of the end faces of the rod-shaped members W can be regulated so that the lengths of the rod-shaped members W can be made uniform and a shift or variation in the radius of curvature, polishing angle and eccentricity is reduced. Further, since there is no need to make uniform the lengths of the rod-shaped members W by removing in advance the adhesive attached to the rod-shaped members W, the polishing process can be simplified.

Next, the operation of the end face polishing apparatus according to this embodiment is described.

As shown in FIG. 1A, first, in a revolving movement, the revolution transmitting shaft 20 is rotated through the gears 18 and 19 by driving the motor 17 for revolution to rotate the polishing plate 25 in a revolving motion by a predetermined eccentric amount. In this case, the rotating shaft 23 for self-rotation is in the revolution transmitting shaft 20. In between this and the first self-rotation transmitting plate 12 a plurality of rotation transmitting plates 14 are arranged, so that the rotation transmitting plates 14 rotate respectively in a same phase as the revolution transmitting shaft 20 in the direction of the first coupling pins 13. Accordingly, even if the first self-rotation transmitting plate 12 stops, or is rotating, the rotation of the revolution transmitting shaft 20 will not be regulated.

On the other hand, in a self-rotating movement, the first self-rotation transmitting plate 12 is rotated by driving the motor 11 for self-rotation. Since the first coupling pin 13 is on the same concentric circle as the first self-rotation transmitting plate 12, the same trail as described above is taken, the rotating shaft 23 for self-rotation is eccentric by a predetermined amount, but is coupled through the rotation transmitting plates 14 so that the same number of rotation as the first self-rotation transmitting plate 12 is transmitted to the rotating shaft 23 for self-rotation.

In this way, the polishing plate 25 self-rotates to revolve by the rotation movement of the revolution transmitting shaft 20 and the rotating shaft 23 for self-rotation.

On the other hand, the rotational direction of the jig plate 30 is regulated by the rotation stopping pin 62 with respect to the polishing member 25a of the polishing plate 25, and the end face of the each of the rod-shaped members W is pressed against the polishing member 25a in a state where the jig plate 30 is biased in the direction of the polishing plate 25 by the pressing shaft 61.

At this time, with the variation in length of the respective rod-shaped members W, the jig plate 30 does not become parallel to the polishing plate 25, and the end face of each of the rod-shaped members W is tilted and polished. However, as polishing carries on, the slidable contact member 40 provided on the lower surface of the jig plate 30 slidably contacts the polishing plate 25, and the jig plate 30 is supported parallel to polishing plate 25. In this way, the lengths of the rod-shaped members W may be made uniform, as well as reducing the shift and variation of a radius of curvature, a polishing angle and eccentricity. Therefore, the tip end of each of rod-shaped members W is processed to be an ideal convex spherical surface.

Embodiment 2

In the above Embodiment 1, the ball member 41 which is a slidable contact member 40 is held rotatably in the lower surface of the jig plate, but in Embodiment 2, an example of a ball member provided rotatably on the polishing surface is explained.

Figure 4A:
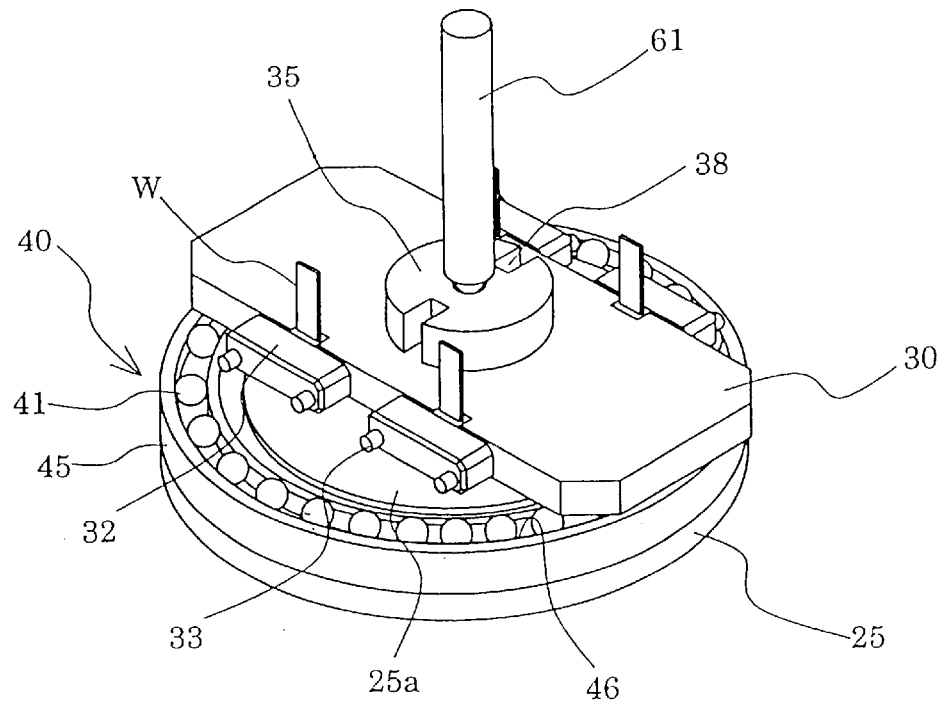
FIGS. 4A and 4B are, respectively, a perspective view and a cross section view of a jig plate and a polishing plate according to Embodiment 2 of this invention.
Figure 4B:
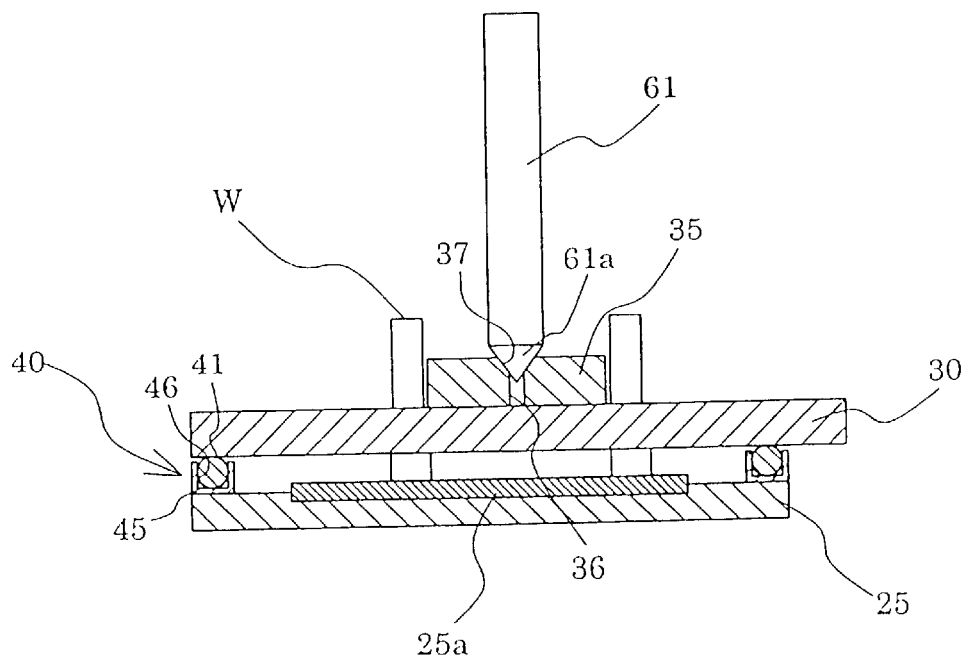

FIGS. 4A and 4B are a perspective view and a cross section view of a jig plate and a polishing plate according to Embodiment 2. Further, members that have similar functions as those in the embodiment described above have the same reference numerals and explanation thereof is omitted.

As shown in FIGS. 4A and 4B, the slidable contact member 40 in this embodiment has an annular shape, and is structured by a holding portion 45 formed with a groove 46 in the circumferential direction of one end face, and a plurality of spherical shape ball members 41 rotatably held in the groove 46 of the holding portion 45. The slidable contact member 40 is fixed in the region opposing the jig plate 30 in the peripheral portion of the polishing plate 25.

With this structure, similar to the above described Embodiment 1, since the rod-shaped member W may be polished with the polishing plate 25 as the standard, the length of the rod-shaped member W can be made uniform as well as reducing the shift and variation of the radius of curvature, the polishing angle and the eccentricity. Further, since there is no need to make uniform the length of the rod-shaped member W by removing in advance the adhesive attached to the rod-shaped member W or the like, the polishing process may be simplified.

Embodiment 3

In the above described Embodiments 1 and 2, the slidable contact member 40 was a ball member 41 so that slidable contact was with low friction, but Embodiment 3 is an example where metal material is used as slidable contact member which slidable contacts with low friction.

Figure 5A:
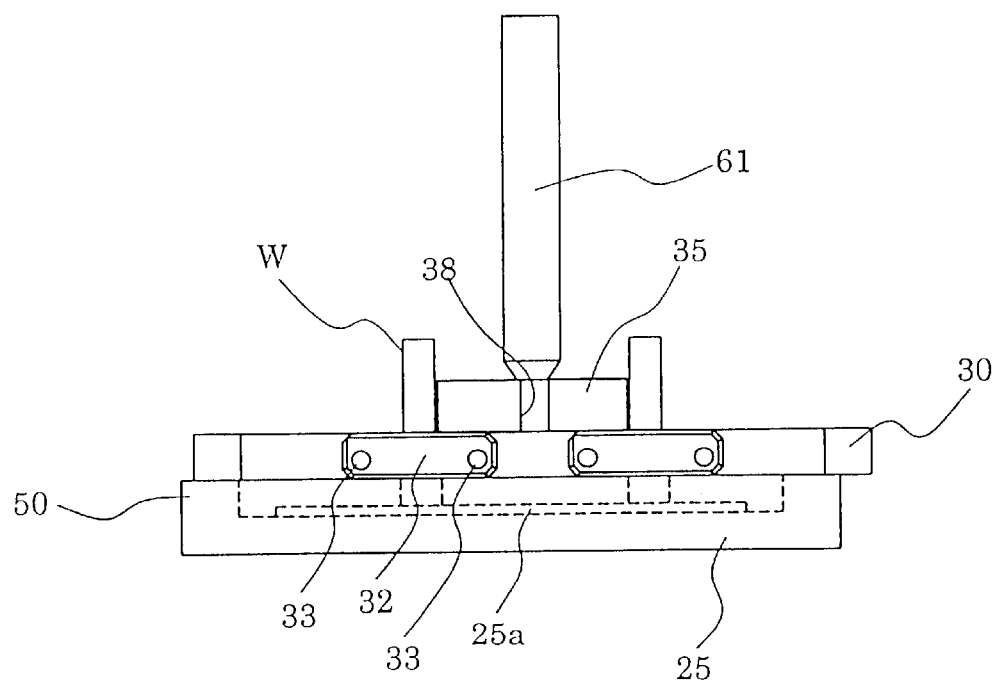
FIGS. 5A and 5B are, respectively, a plan view and a cross section view of a jig plate and a polishing plate according to Embodiment 3 of this invention.
Figure 5B:
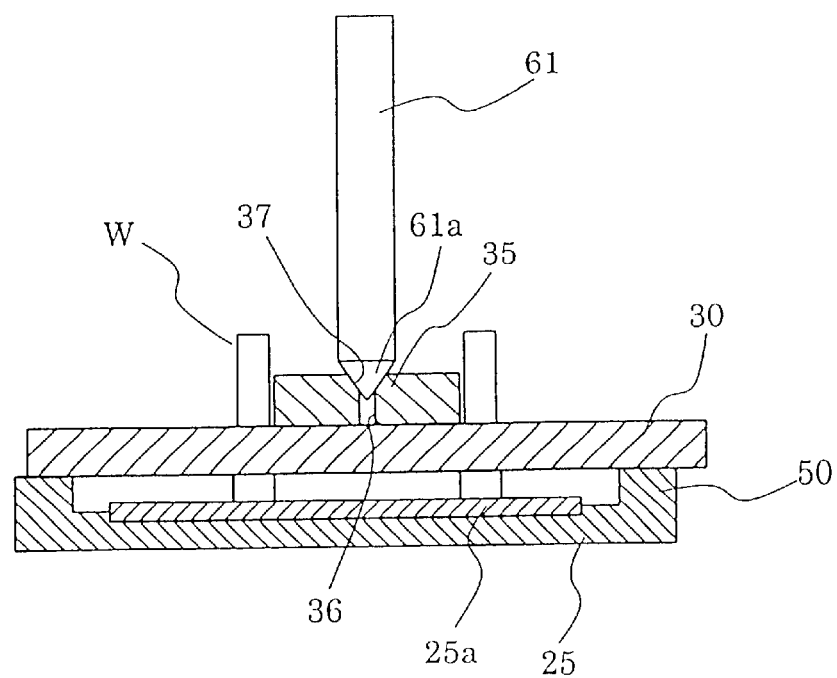

FIGS. 5A and 5B are a plan view and a cross section view of a jig plate and a polishing plate according to Embodiment 3. Further, members that have similar functions as those in the embodiment described above have the same reference numerals and explanation thereof is omitted.

As shown in FIG. 5, the slidable contact member 40 of this embodiment is made of a protruding portion 50 which is a peripheral portion of the polishing plate 25 protruding in the direction of the jig plate 30. The polishing plate 25 provided with an elongated slidable contact member 40 is formed of oil-less metal with low friction resistance at the time of slidable contact.

In this way, by forming the slidable contact member 40 a spherical protruding portion 50 of the polishing plate 25, and by forming at least the protruding portion 50 of the polishing plate 25 with an oil-less metal, the structure can be simplified as well as preventing the rod-shaped member W from chipping during polishing to thereby enable slidable contact with low friction.

With this structure, similar to the above described Embodiments 1 and 2, since the rod-shaped member W may be polished with the polishing plate 25 as the standard or polishing, the length of the rod-shaped member W can be made uniform, as well as reducing the shift and variation of the radius of curvature, the polishing angle and the eccentricity. Further, since there is no need to make uniform the length of the rod-shaped member W by removing in advance the adhesive attached to the rod-shaped member W or the like, the polishing process may be simplified.

While several embodiments according to the present invention have been described, the fundamental structure of the end face polishing apparatus is not limited to the foregoing described embodiments.

For example, the polishing plate 25 in the above described Embodiments 1 to 3 may be provided with an adjustment mechanism for adjusting only the height of the polishing member 25a without changing the height of the region that the slidable contact member 40 slidable contacts. By this, the length of the rod-shaped member W can be adjusted.

As described in detail in the embodiments, the end face polishing apparatus of this invention is provided with a slidable contact member on either one of the jig plate or the polishing plate to contact the other with a low friction, so that polishing with the polishing plate as the standard for polishing may be conducted, the length of the rod-shaped member W can be made uniform, as well as reducing the shift and variation of the radius of curvature, the polishing angle and the eccentricity. Further, since there is no need to make uniform the length of the rod-shaped member W by removing in advance the adhesive attached to the rod-shaped member W or the like, the polishing process may be simplified.

What is claimed is:

1. An end face polishing apparatus comprising: a lip plate for supporting at least one workpiece having an end face; a polishing plate mounted for undergoing movement and having a main surface; a polishing member mounted on the main surface of the polishing plate for undergoing movement therewith to polish the end face of the workpiece; and regulating means for regulating a polishing amount of the end face of the workpiece and comprised of a shoulder portion of the polishing plate extending from the main surface thereof for contacting the jig plate during polishing of the end face of the workpiece.

2. An end face polishing apparatus according to claim 1; wherein the shoulder portion of the polishing plate is made of an oil-less metal.

3. An end face polishing apparatus according to claim 1; wherein the polishing plate comprises a base portion having the main surface; and wherein the base portion and the shoulder portion of the polishing plate are made of a single piece of material.

4. An end face polishing apparatus according to claim 3; wherein the polishing plate is made of an oil-less metal.

5. An end face polishing apparatus comprising: a jig plate for supporting at least one workpiece having an end face, the jig plate having a main surface and a peripheral portion surrounding the main surface so that the workpiece extends from a preselected surface portion of the main surface; a polishing plate mounted for undergoing movement, the polishing plate having a main surface and a peripheral portion surrounding the main surface; a polishing member mounted on the main surface of the polishing plate for undergoing movement therewith to polish the end face of the workpiece during a polishing operation while the end face of the workpiece is disposed in contact with a preselected surface portion of the polishing member; and a slidable contact member disposed on one of the jig plate and the polishing plate for contacting the other of the jig plate and the polishing plate to thereby regulate a polishing amount of the end face of the workpiece; wherein during a polishing operation when the slidable contact member is disposed on the jig plate, the slidable contact member contacts a portion of the polishing plate disposed closer to the peripheral portion of the polishing plate than the preselected surface portion of the polishing member; and wherein during a polishing operation when the slidable contact member is disposed on the polishing plate, the slidable contact member contacts a portion of the main surface of the jig plate disposed closer to the peripheral portion of the jig plate than the preselected surface portion of the jig plate.

6. An end face polishing apparatus according to claim 5; wherein the at least one workpiece comprises a rod-shaped member.

7. An end face polishing apparatus according to claim 5; wherein the at least one workpiece comprises a plurality of workpieces each having an end face.

8. An end face polishing apparatus according to claim 7; wherein the plurality of workpieces comprise a plurality of rod-shaped members.

9. An end face polishing apparatus according to claim 5; further comprising moving means for moving the polishing plate and the polishing member to undergo revolving and rotating movement to polish the end face of the workpiece.

10. An end face polishing apparatus according to claim 9; further comprising support means for supporting the jig plate to bring the end face of the workpiece into pressure contact with the polishing member during polishing of the workpiece.

11. An end face polishing apparatus according to claim 10; wherein the support means includes means for regulating rotational movement of the jig plate relative to the polishing plate.

12. An end face polishing apparatus according to claim 5; wherein the slidable contact member has a portion extending from the main surface of the jig plate for contacting the polishing plate during polishing of the end face of the workpiece.

13. An end face polishing apparatus according to claim 12; wherein the length of the portion of the workpiece extending from the main surface of the jig plate is greater than the length of the portion of the slidable contact member extending from the main surface of the jig plate.

14. An end face polishing apparatus according to claim 12; further comprising support means for supporting the jig plate to bring the end face of the workpiece into pressure contact with the polishing member during polishing of the workpiece.

15. An end face polishing apparatus according to claim 14; further comprising an adjusting mechanism for adjusting a height of the polishing member.

16. An end face polishing apparatus according to claim 13; further comprising an adjusting mechanism for adjusting a height of the polishing member.

17. An end face polishing apparatus according to claim 5; further comprising support means for supporting the jig plate to bring the end face of the workpiece into pressure contact with the polishing member during polishing of the workpiece.

18. An end face polishing apparatus according to claim 5; further comprising an adjusting mechanism for adjusting a height of the polishing member.

19. An end face polishing apparatus according to claim 5; further comprising a support mechanism for supporting the jig plate to bring the end face of the workpiece into pressure contact with the polishing member during polishing of the workpiece, and a regulating mechanism for regulating rotational movement of the jig plate relative to the polishing plate.

20. An end face polishing apparatus according to claim 5; wherein the slidable contact member comprises a ball member.

21. An end surface polishing apparatus comprising:
a jig plate for supporting at least one workpiece having an end face;
a polishing plate mounted for undergoing movement and having a main surface;
a polishing member mounted on the main surface of the polishing plate for undergoing movement therewith to polish the end face of the workpiece;
regulating means for regulating a polishing amount of the end face of the workpiece and comprised of a shoulder portion of the polishing plate extending from the main surface thereof for contacting the jig plate during polishing of the end face of the workpiece;
a first rotational shaft mounted for undergoing rotation about a first axis and for undergoing revolving movement about a second axis offset from the first axis, the first rotational shaft having a first end for connection to the polishing member to rotate and revolve the polishing member about the first and second axes, respectively;
a second rotational shaft for undergoing rotation about the second axis;
support means for supporting the second rotational shaft to undergo free rotation about the second axis; and
drive means for rotationally driving the first rotational shaft and the second rotational shaft.

22. An end face polishing apparatus according to claim 21; further comprising a movable support mechanism for supporting the jig plate and for moving the jig plate to bring the end face of the workpiece into pressure contact with the polishing member to thereby polish the end face of the workpiece during rotation and revolving movement of the first rotational shaft.

23. An end face polishing apparatus according to claim 21; wherein the shoulder portion of the polishing plate is made of an oil-less metal.

24. An end face polishing apparatus according to claim 21; wherein the polishing plate comprises a base portion having the main surface; and wherein the base portion and the shoulder portion of the polishing plate are made of a single piece of material.

25. An end face polishing apparatus according to claim 24; wherein the polishing plate is made of an oil-less metal.

* * * * *